United States Patent
Charles et al.

(10) Patent No.: US 7,730,527 B2
(45) Date of Patent: Jun. 1, 2010

(54) PROCEDURE FOR CONTROLLING ACCESS TO A SOURCE TERMINAL NETWORK USING A BLOCK MODE TUNNEL AND COMPUTER PROGRAMS FOR ITS IMPLEMENTATION

(75) Inventors: Olivier Charles, Paris (FR); Laurent Butti, Boulogne Billancourt (FR); Franck Veysset, Moulineaux (FR)

(73) Assignee: France Telecom, Paris (FR)

( * ) Notice: Subject to any disclaimer, the term of this patent is extended or adjusted under 35 U.S.C. 154(b) by 1160 days.

(21) Appl. No.: 11/139,034

(22) Filed: May 27, 2005

(65) Prior Publication Data

US 2005/0273848 A1 Dec. 8, 2005

(30) Foreign Application Priority Data

Jun. 1, 2004 (EP) .................................. 04291363

(51) Int. Cl.
*G06F 9/00* (2006.01)
(52) U.S. Cl. ........................................................ 726/11
(58) Field of Classification Search ...................... 726/9, 726/11; 380/270
See application file for complete search history.

(56) References Cited

U.S. PATENT DOCUMENTS 7,454,622 B2 * 11/2008 Laidlaw et al. ............... 713/182

2003/0035006 A1 * 2/2003 Kodosky et al. ............ 345/763
2003/0204744 A1 10/2003 Maltais et al.
2004/0053601 A1 * 3/2004 Frank et al. ................. 455/411

OTHER PUBLICATIONS

Haidong Xia et al., "Detecting and Blocking Unauthorized Access in Wi-Fi Networks"; Networking 2004, Networking Technologies, Services, and Protocols; Performance of Computer and Communication Networks; Mobile and Wireless Communications. Third International IFIP-TC6 Networking Conference Proceedings. (Lecture notes in Comput. Sci., May 2004), pp. 795-806.
Vaughn-Nichols S.J., "Securing your Wi-Fi Connection on the Road", Wi-Fi Planet, "Online", Nov. 7, 2003, www.wi-fiplanet.com/tutorials/article.php/3106011.

(Continued)

*Primary Examiner*—Ellen Tran
(74) *Attorney, Agent, or Firm*—Miles & Stockbridge P.C.; James T. Carmichael; Stephen W. Aycock, II

(57) ABSTRACT

Disclosed is a method and system for controlling access of a source terminal to a network that includes, in particular, a firewall and an authentication portal that maintains the firewall during an access request originating from the source terminal and which permits access when periodically and subsequently provided with a valid authentication token. The source terminal can also communicate in tunnel mode with the destination terminal of the network via a block mode tunnel. Authentication tokens are periodically supplied on the OSI Layer 2 level so that the tokens continue to be provided during a block tunnel mode communication. A network operator can maintain access control using a captive portal paradigm even when a user chooses to use a block mode tunnel.

13 Claims, 3 Drawing Sheets

OTHER PUBLICATIONS

[ARP] Address Resolution Protocol, "An Ethernet Address Resolution Protocol," RFC 826, Nov. 1982, pp. 1-8.

[HMAC-MD5] Krawcyzk, H., Bellare M., and Canettit, R., "HMAC: Keyed-Hashing for Message Authentification," RFC 2104, Feb. 1997, pp. 1-11.

[1EEE-802.11-1997] Institute of Electrical and Electronic Engineers, "Information Technology—Telecommunications and Information Exchange between Systems—Local and Metropolitan Area Network-Specific Requirements—Part 11: Wireless LAN Medium Access Control (MAC) and Physical Layer (PHY) Specifications," IEEE Standard 802.11,1997, pp. 1-459.

[IPSec] Kent, S., and R. Atkinson, "Security Architecture for the Internet Protocol," RFC 2401, Nov. 1998, pp. 1-63.

[TLS] Dierks, T. and Allen, C., "The TLS Protocol Version 1.0," RFC 2246, Jan. 1999., pp. 1-76.

(IEEE Std 802.1X-2001), ] Institute of Electrical and Electronic Engineers, IEEE Standard for Local and Metropolitan Area Networks, "Port-Based Network Access Control", Sponsor: LAN/MAN Standards Committee of the IEEE, Approved Jun. 14, 2001 IEEE-SA Standards Board, Approved Oct. 25, 2001 American National Standards Institute, pp. 1-142.

802.3® IEEE Standard for Information technology—Telecommunications and information exchange between systems—Local and metropolitan area networks—Specific requirements, Part 3: Carrier sense multiple access with collision detection (CSMA/CD) access method and physical layer specifications Published by The Institute of Electrical and Electronics Engineers, Inc.,3 Park Avenue, New York, NY 10016-5997, USA, Mar. 8, 2002, IEEE Computer Society, Sponsored by the LAN/MAN Standards Committee. pp. 1-578.

802.3® IEEE Standard for Information technology—Telecommunications and information exchange between systems—Local and metropolitan area networks—Specific requirements—Part 3: Carrier Sense Multiple Access with Collision Detection (CSMA/CD) access method and physical layer specifications Section Two: This section includes Clauses 21 through 33 and Annexes 22A through 32A, pp. 1-582.

802.3® IEEE Standard for Information technology—Telecommunications and information exchange between systems—Local and metropolitan area networks—Specific requirements—Part 3: Carrier Sense Multiple Access with Collision Detection (CSMA/CD) access method and physical layer specifications Section Three: This section includes Clauses 34 through 43 and Annexes 36A through 43C, pp. 1-379. Telecommunications and information exchange between systems— Local and Metropolitan area networks—Specific requirements—Part 11: Wireless Lan Medium Access Control (Mac) and Physical Layer (Phy) Specifications - Sponsor Lan Man Standards Committee of the IEEE Computer Society - Reaffirmed 6/12/03 IEEE-Sa Standards Board, pp. 1-528.Multiple Access with Collision Detection.

ANSI/IEEE Std 802.11, 1999 Edition (R2003)Information technology—Telecommunications and information exchange between systems—Local and Metropolitan area networks—Specific requirements—Part 11: Wireless LAN Medium Access Control (MAC) and Physical Layer (PHY) Specifications—Sponsor LAN MAN Standards Committee of the IEEE Computer Society—Reaffirmed Jun. 12, 2003 IEEE-SA Standards Board, pp. 1-528.

EEE Std 802.11i™-2004 [Amendment to IEEE Std 802.11™, 1999 Edition (Reaff 2003) as amended by IEEE Stds 802.11a™-1999, 802.11b™-1999, 802.11b™-1999/Cor 1-2001, 802.11d™-2001, 802.11g™-2003, and 802.11h™-2003]802.11iTM IEEE Standard for Information technology—Telecommunications and information exchange between systems—Local and metropolitan area networks—Specific requirements Part 11: Wireless LAN Medium Access Control (MAC) and Physical Layer (PHY) specifications Amendment 6: Medium Access Control (MAC) Security Enhancements—3 Park Avenue, New York, NY 10016-5997, USA—IEEE Computer Society Sponsored by theLAN/MAN Standards Commitee—Jul. 23, 2004 Print: SH95248 PDF: SS95248, pp. 1-190.

International Standard ISO/IEC 7498-I—Second edition 1994-I I-I 5—Corrected and reprinted 1996-06-I 5 Information technology—Open Systems Interconnection—Basic Reference Model; The Basic Model—Reference No. ISO/I EC 7498-I : 1994(E), pp. 1-68.

International Standard ISO/IEC 7498-3 Second edition 1997-04-I 5—Information technology—Open Systems Interconnection—Basic Reference Model: Naming and addressing— Reference No. ISO/I EC 7498-3 : 1997(E) pp. 1-32.

International Standard ISOIEC—7498-4 First edition—1989-II-15—Information processing systems —Open Systems Interconnection— Basic Reference Model—Part 4 : Management framework—Reference No. ISO/I EC 7498-4 : 1989(E), pp. 1-16.

Wi-Fi Protected Access (WPA) Abstract—This document captures those clauses of the IEEE 802.11i Draft 3.0 that comprise an enhanced security implementation for 802.11i known as Wi-Fi Protected Access. Implementation notes are also provided. Line number references to the 802.11i Draft 3.0 standard are used throughout this document. In order to ensure consistent referencing, this document should be used in conjunction with the Portable Document Format (PDF) version of the IEEE 802.11i Draft 3.0 standard, pp. 1-32.

* cited by examiner

PROCEDURE FOR CONTROLLING ACCESS TO A SOURCE TERMINAL NETWORK USING A BLOCK MODE TUNNEL AND COMPUTER PROGRAMS FOR ITS IMPLEMENTATION

In general terms, this invention relates to techniques for accessing a computer network.

More specifically, the invention relates to a procedure for controlling access of a source terminal to a network that includes an access point for this terminal, a firewall connected to the access point, and an authentication portal serviced by an authentication database. This portal places the firewall in an access authorization status in response to an initial access request in basic mode originating from the source terminal and includes providing the portal or firewall with valid authentication data, in the absence of which the firewall is placed in an access denial status. The firewall remains in access authorization status in basic mode in response to the periodic supply, by the source terminal over a token exchange secure channel, of a valid authentication token, in the absence of which the firewall is placed in access denial status, and the source terminal selectively communicates in tunnel mode with a destination terminal of the network using a block tunnel.

Controlling access to a network is the procedure by which a network operator authorizes or denies a potential user from using their network.

Now, there are situations in which it is not longer possible, due to the time, for operators to maintain access control to their networks because the user chooses to use a block mode tunnel, which makes it impossible to establish communication between the user and network operator.

For operational or security reasons, a network users can indeed be forced to establish a tunnel to a remote host, within which they encapsulate their traffic. Depending on the configuration and software programs used, this tunnel can be a block tunnel—that is, it can reject any communications that do not use this tunnel in both the reception and transmission directions.

In fact, this block mode is an additional security guarantee for the user. Indeed, if a user connects to his/her company's private network or "Intranet" via a tunnel, a hacker cannot attack this user's machine to use it as a relay to access the user's company Intranet.

In this context, the purpose of the invention is to suggest a procedure that allows network operators to maintain access control to their network, even if the user chooses to use a block mode tunnel.

To this end, the procedure of the invention, which also complies to the generic definition given by the above introduction, is essentially characterized in that at least the periodic provision of the authentication token is performed by a transmission over the level 2 layer of the token exchange channel OSI model established between the source terminal and the firewall, which results in that the periodic provision of the authentication token continues to be ensured during a block tunnel mode communication.

For example, the procedure of the invention includes, after an initial successful authentication operation by the source terminal, at least one operation that creates secret information implemented on the source terminal and/or over the captive portal by at least respective application programs, and operations that retransmit this secret information to the corresponding authentication entities of the source terminal and the firewall.

Traditionally, the term "secret information" as it is used in this description will be understood as covering not only, in the literal sense, specific, distinct, and directly useable secret information, but also all the elements that allow deriving or regenerating such secret information in the literal sense.

Advantageously, the secret information can be transmitted from the captive portal to the source terminal in an authentication window.

In this case, in particular, the authentication window can also ensure the transmission, from the captive portal to the source terminal, of a counter initialized both at the source terminal end and the captive terminal end.

Furthermore, the authentication window can advantageously include a disconnection button.

After the initial successful authentication operation of the source terminal, the authentication token is, for example, periodically provided by the authentication entity of the source terminal and sent to the authentication entity of the firewall, which checks this token.

Similarly, after an initial successful authentication operation of the source terminal, the counter is preferably periodically provided by the authentication entity of the source terminal and sent the authentication entity of the firewall, which checks this counter.

After checking the data provided by the authentication entity of the source terminal, the authentication entity of the firewall can thus place a firewall filtering module in an access authorization or denial status, depending on the result of this check.

The authentication entity of the source terminal is, for example, created using Java, downloaded during the initial authentication of this source terminal, and executed in the session maintenance window.

Additionally, the Level 2 transmission established between the authentication entities of the source terminal and the firewall is advantageously developed according to an extension of the ARP protocol.

The invention also relates to a first computer program designed to be implemented on the source terminal and conceived to conditionally authorise a connection by this source terminal in block tunnel mode with a destination terminal of a network through a firewall controlled by a network captive portal. This first program is characterized in that it includes an initialization module for recovering the shared secret information from the portal and initialising a counter, a periodic authentication confirmation module invoked by the initialization module and designed to create and transmit to the firewall, over the OSI model Layer 2, a unique authenticator that depends on at least the shared information and the counter contents, and the update and decision module invoked by the periodic authentication confirmation module and designed to increment the counter, to terminate the connection in the event of a communication error with the firewall, and to again invoke the periodic authentication confirmation module if the opposite is true, which results in that the source terminal continues to be authenticated by the firewall during the block tunnel mode connection.

The invention also relates to a second computer program, designed to be implemented on a firewall installed on a network and controlled by a captive portal of the network, for conditionally authorizing a block tunnel mode connection between the source terminal and the destination terminal of this network via the firewall. This second program is characterized in that it includes a network listener module, a selection module, and an analysis and decision module, in that the network listener module, in response to an authentication request received from the source terminal, is likely to recover shared secret information originating in this source terminal, in that the selection module is invoked by the listener module and likely to obtain, in the frame stream that flows over the OSI model Layer 2, the authentication frames from the source terminal, and to route the authentication frames to the analysis and decision module, and in that the analysis and decision module checks the content of the authentication frames, terminates the connection of the source terminal in the case of an error, and updates the connection authorization rules used by the firewall in opposite case.

The invention also relates to a system for controlling the access of a source terminal to a computer network that includes a firewall placed between said computer network and the access point for said source terminal, and an authentication portal that controls the status of said firewall, in which the firewall can maintain an open and secure communication channel for the source terminal as long as the source terminal sends, either periodically or even-triggered, an authentication token. This system is characterized in that:

the firewall includes an authentication protocol module and a filtering module; said authentication protocol module gives said filtering module the status "pass" or "block" for the communication between the source terminal and the computer network, depending on whether the source terminal is authenticated or not, the authentication portal contains an application program that can distribute this secret information to the authentication protocol module when the initial authentication of the source terminal over the computer network is successful, the source terminal includes an authentication protocol module and an application program; this application program can distribute the secret information of said authentication protocol module when the initial authentication of the source terminal over the computer network is successful, and in that the authentication protocol module can send said authentication tokens to the authentication protocol module using the OSI model Layer 2.

Other characteristics and advantages of the invention will become evident in the description below, given for non-limiting illustration purposes, with reference to the attached diagrams, in which:

FIG. 1 schematically represents the functional resources necessary for implementing the invention.

Figure 1:
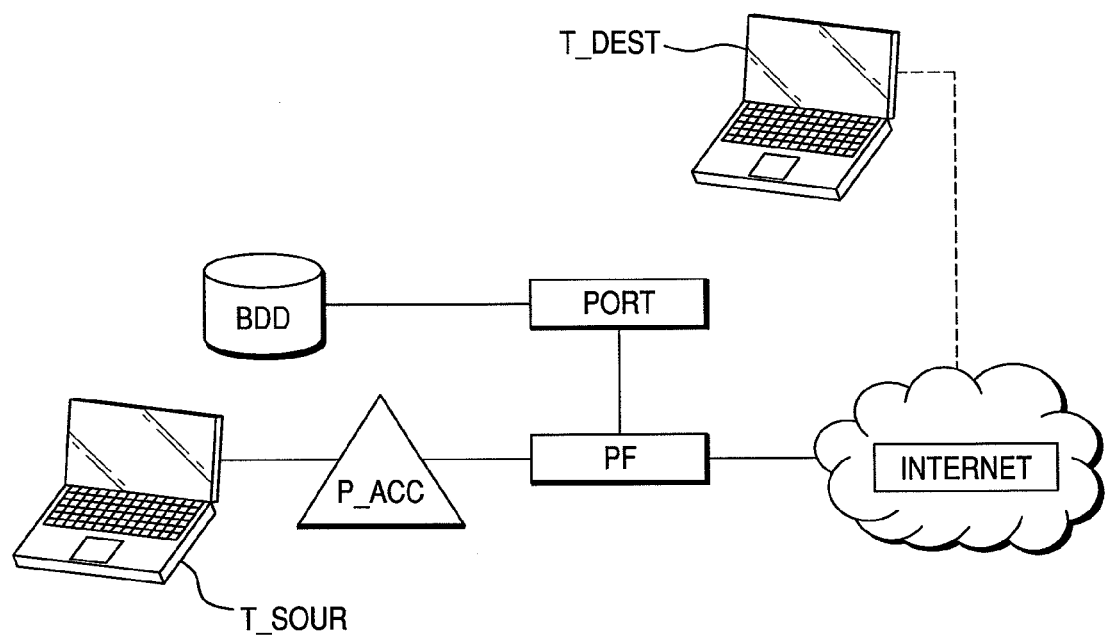

Given the necessity, in order to describe in detail the procedure of the invention in a way that can be understood by those skilled in the art, to use the standard vocabulary of the latter, the reader that is not familiar with the field in question will find below definitions and references that will be useful for understanding the description.

Definitions

IP address: The address of an equipment piece using IP (see this term) as the Layer 3 protocol of the OSI model (see this term.)

MAC address: The address of an equipment piece connected to a shared media used by the Layer 2 of the OSI model (see this term.)

ARP (Address Resolution Protocol): IP address resolution protocol in OSI model Layer 2 (see this term) MAC addresses, that allows communicating stations on an Ethernet-based network. The real communication is indeed based on the MAC address of the source and destination.

DHCP (Dynamic Host Configuration Protocol): Dynamic host configuration protocol of the address over an IP network (see this term.)

DNS (Domain Name Server or Domain Name System): Essential Internet service that ensures the conversion of domain names into IP addresses (see this term.)

Hashing function: This expression indicates a function that converts a character string of any length into a smaller fixed-size character string. This string is called hash. The result of a hashing function is the same for the same input string, but in principle, there are no two results of the hashing function that are alike.

Keyed hashing function: This expression indicates a hashing function that, in addition to the character strings of any length, take a secret key as an input.

HMAC-MD5 (Keyed-Hashing for Message Authentication—Message Digest 5): Keyed-hashing function (see this term)—type cryptographic algorithm.

HMAC-SHA1 (Keyed-Hashing for Message Authentication—"Secure Hash Algorithm"): "Keyed-hashing" (see this term) type cryptographic algorithm.

HTML (Hypertext Markup Language): Internet document format defined by the RFC 1866 standard.

HTTPS (Hypertext Transfer Protocol Secure): Transmission protocol originated for the "Netscape" browser and linked to a secure connection.

IP (Internet Protocol): Oriented offline network level protocol used on the Internet (principle of the datagram).

IPSec (Internet Protocol Security): Security protocol used in the Internet.

MAC (Medium Access Control): General term indicating the layer that manages the sharing of a transmission medium between different stations.

Open Source: Open source software that responds to defined qualitative requirements.

OSI (Open System Interconnection): Interconnection model of open systems where all the actions that allow the cooperation of several computer equipment are structured in layers that correspond to different detail levels.

SSL (Secure Socket Layer): Secure network communication mode standard, used initially by the "Netscape" browser and then standardised.

TCP (Transport Control Protocol): Oriented online transport protocol that allows reliable exchange of any quantity of data between two equipment pieces (OSI Level 4—see this term) linked using one or several networks using IP (see this term.)

TLS (Transport Layer Security): Security protocol of the transport layer, defined by the RFC 2246 standard. Version 1.0 of TLS is, in fact, version 3 of SSL (see this term.)

UDP (User Datagram Protocol): Transport protocol of independent data blocks or "packets" that travel over a network and contain all the data necessary for their routing.

URL (Uniform Resource Locator): Address format that allows finding a resource.

VPN (Virtual Private Network): A virtual private network.

References

[ARP] Address Resolution Protocol, "An Ethernet Address Resolution Protocol," RFC 826, November 1982.

[HMAC-MD5] Krawczyk H., Bellare M., and Canettit R., "HMAC: Keyed-Hashing for Message Authentication," RFC 2104, February 1997.

[IEEE-802.1x-2001] Institute of Electrical and Electronics Engineers, "Local and Metropolitan Area Networks: Port-based Network Access Control," IEEE Standard 802.1x, September 2001.

[IEEE802.3-2002] IEEE Standard for Information Technology—Telecommunications and information exchange between systems—Local and metropolitan area networks—Specific requirements—Part 3: Carrier Sense Multiple Access with Collisions Detection (CSMA/CD) Access Method and Physical Layer Specifications.

[IEEE-802.11-1977] Institute of Electrical and Electronic Engineers, "Information Technology—Telecommunications and Information Exchange between Systems—Local and Metropolitan Area Network—Specific Requirements—Part 11: Wireless LAN Medium Access Control (MAC) and Physical Layer (PHY) Specifications," IEEE Standard 802.11.1997.

[IEEE-802.11-1999] Institute of Electrical and Electronic Engineers, "Information Technology—Telecommunications and Information Exchange between Systems—Local and Metropolitan Area Network—Specific Requirements—Part Iq: Wireless LAN Medium Access Control (MAC) and Physical Layer (PHY) Specifications," IEEE Standard 802.11.1999.

[IEEE-802.11i] Institute of Electrical and Electronic Engineers, "Unapproved Draft Supplement to Standard for Telecommunications and Information Exchange between Systems—LAN/MAN Specific Requirements—Part II: Wireless LAN Medium Access Control (MAC) and Physical Layer (PHY) Specifications: Specification for Enhanced Security," IEEE Draft 802.11i (work in progress,) 2003.

[IPSec] Kent, S., and R. Atkinson, "Security Architecture for the Internet Protocol," RFC 2401, November 1998.

[OSI] International Organisation for Standardisation, "Open Systems Interconnection," OSI 7498.

[TLS] Dierks, T. and Allen, C., "The TLS Protocol Version 1.0," RFC 2246, January 1999.

[WPA] Wi-Fi Protected Access, Wi-Fi Alliance, Version 1.2, December 2002.

The procedure described below is typically applied to a scenario in which network operators perform an access control at the TCP/IP level and in which users wish to use a tunnel such as [IPSec] in block mode.

The invention can find relevant use in radioelectric IEEE 802.1 ([IEEE-802.11-1977] and [IEEE-802.11-1999]) and "first generation" networks—that is, networks that do not implement new security functionalities at the [OSI] model Level 2 such as WPA or 802.11i., and in wired IEEE 802.3 ([IEEE802.3-2002]) and Ethernet networks that control access according to the "captive portal" paradigm.

Status of the Previous Technique

A preliminary to access control is authentication. Authentication allows a network operator to determine with certainty the identity of the user that wishes to use the operator's network.

In order to authenticate a user, the network operator must dialogue with the user.

If authentication is successful, the network operator will decide, according to the user identity, whether the user is authorized or not to access the network.

In order to prevent unauthorized users from accessing the network, the following is necessary for access control:

ensuring that only the users that the operator has authorized can use the network—that is, prevent unauthorized users from using the network, and maintaining the authentication relationship with the user—that is, ensuring that the authorized user that uses the network is indeed the same user that has been authenticated, in order to prevent unauthorized users from taking over the identity of an authorized user.

There are several techniques that allow controlling network access, in particular:

physical techniques: for example, sockets allowing access to the network are located in key-locked installations, and logical techniques: for example, network access is conditioned by the possession of secret information that allows using cryptographic techniques.

In the absence of security mechanisms that include level 2 access (linked to the data) of the [OSI] seven layer model or due to the costs related to the deployment of such mechanisms when they exist and due to their very low penetration rate in user equipment, the "captive portal" paradigm has been developed.

This paradigm allows performing access control to TCP/IP networks:

by filtering MAC and IP addresses, and by using authentication tokens exchanged between the source terminal and the authentication portal.

When users connect to the network, they are prompted to open their Internet browser, and their first request, using the browser, is automatically redirected to the authentication portal of the operator (thus the term captive portal.) This captive portal allows users to authenticate themselves in a secure manner, for example, by using the SSL/[TLS] protocols.

Any other requests by non-authenticated users are blocked by a firewall that filters by MAC address and/or IP address. In the case of successful authentication and if the authenticated users are authorized to access the network, the firewall is updated to allow traffic from these users to pass.

The architecture of a captive portal (FIG. 1,) which allows a source terminal T_SOUR to communicate in tunnel mode with a destination terminal T_DEST of the network, thus globally implies an access point P_ACC, a firewall PF, the authentication portal itself PORT, and an identification database BDD.

The access point P_ACC offers a source terminal T_SOUR a wired or wireless (Wi-Fi, for example) connection path to the Internet network.

The firewall PF directly controls the terminal T_SOUR access to the Internet network by filtering the packets (normally at the IP and TCP level,) and by employing a filter by MAC address.

The portal PORT authenticates the user, intercepts the requests by non-authenticated users, redirects these users to an authentication page, checks their authentication data using the database BDD, modifies the firewall PF rules according to the result of this check, and therefore controls the firewall status.

The database BDD itself contains the valid data of authorized users, and responds to the portal PORT requests.

Because the access control by MAC address and IP address is intrinsically weak (in fact, it is very easy, with simple software manipulation, to take control of the MAC address and IP address of a user,) the captive portal PORT employs an additional access control using a token exchanged between the source terminal and the authentication portal.

Indeed, the captive portal maintains a secure communication channel open with the user, on which the user must present, either periodically or event-triggered, an authentication token. If the token is not presented, the firewall is reinitialized to the block status for this user. Thus, an unauthorized user that has taken over a MAC address and/or IP address of an authorized user will not be able to present this token and his/her connection will be terminated. Even if the simultaneous presence of an authorized user responsible for presenting the token and an unauthorized user that has taken over the MAC address and IP address of this authorized user is foreseeable, the operating mechanisms of the TCP/IP protocols will render these connections useless; an unauthorized user that wants to take advantage of the connection of and authorized user will have, for the time being, no choice but to shut out the authorized user, for example, using a denial of service. After shutting out the authorized user, the unauthorized user can only use the service whilst the captive portal does not request the presentation of the token, whose time interval can be configured at the captive portal PORT level.

The "captive portal" paradigm such as it has been described until now is applicable, for example, to both radioelectric networks using IEEE802.11 technology and local wired networks using IEEE 802.3/Ethernet technology.

In the case of radioelectric networks using IEEE 802.11 technology, the security mechanisms foreseen originally in the [IEEE802.11-1997] and [IEEE802.11-1999] standard have quickly revealed significant problems that make their use both complicated and ineffective: it is the failure in 2000 and 2001 of security mechanisms known as "WEP."

Even if more robust security mechanisms are being deployed [WPA] or standardised [IEEE-802.11i,) they currently do not have the maturity required for massive deployment.

Two scenarios in which the "captive portal" paradigm is applied to radioelectric networks using IEEE-802.11 technology are:

in local radioelectric networks, called "Hot-Spots," that use IEEE 802.11 technology and are deployed in areas with heavy traffic, for example, in hotel reception halls or airport waiting lounges, where the availability of an Internet connection represents high added value, and for network access by a company to its visitors to allow the latter to work in a more efficient manner, for example, in meeting rooms.

In the case of local wired networks using IEEE 802.3/Ethernet technology, no security mechanism was foreseen originally. It is only in 2001, with the adoption of the [IEEE802.1x-2001] standard that security mechanisms were applied for these networks.

Nevertheless, their penetration rate in user equipment parks is still low. This is why a company wishing to offer network access to its visitors, for example, in a meeting room, can be lead to use the "captive portal" paradigm.

The weakness of the known captive portal technique, which reinforces access control by filtering the IP address and/or MAC address by exchanging an authentication token, specifically resides in the fact that this technique assumes that the operator and user can communicate with each other in order to exchange the token.

Furthermore, the most typical application employed by users in the scenarios presented above consists in, for these users, mounting a tunnel (thus creating a VPN) to their company's Intranet.

For security reasons, most VPN applications therefore block all communication to or from the user that is not the communication that passes inside the VPN. These are therefore block mode tunnels.

In this case, it is therefore no longer possible to maintain the exchange of the authentication token, and no solution is currently available to solve this problem.

Consequently:

either the securisation by token exchange is therefore purely and simply abandoned in the "captive portal" paradigm, in which case, access control to the network will only consist in filtering by IP address and/or MAC address, which presents critical vulnerabilities, or the securisation by token exchange is maintained and the user cannot mount a block mode tunnel, for example to the user's company Intranet, because the first token exchange request after the tunnel is established will fail and the user's traffic will be blocked.

Principle of the Invention

The invention allows network operators to maintain efficient access control to their network, even if the user chooses to use a block mode tunnel.

This invention suggests a periodic re-authentication mode that is completely invisible to the user. Furthermore, the use of a transmission channel not assigned by the block mode between the terminal and the captive portal allows exchanging additional data, for example, connection duration or consumed volumes.

The invention is based on the observation from the fact that the block mode technique used, for example, by IPSec users, has the property of filtering data packets at the OSI model Level 3.

This property, which is not published by software developers, results in that the use of a block mode tunnel cannot be exempt of the communication performed at the OSI model Level 2 by the protocol in question, for example, the ARP protocol.

The invention builds on this property in order to maintain the exchange of the authentication token, but at the OSI model Level 2, and not Level 3 or greater, as is the case for the current status of the technique.

The modification thus given allows not only maintaining the block mode of the IPSec user, but also using a robust periodic authentication protocol.

To do so, the session control—that is, normally the token exchange mechanism between the source terminal T_SOUR and the portal PORT, is moved to the OSI model Level 2 (L2 on FIGS. 2 and 3,) which allows separating it from all the block modes (M_BLQ on FIG. 3) that may be implemented by the user of the terminal T_SOUR on the higher layers of this model.

Indeed, it is not possible for the user of a block mode tunnel to prevent communication of his/her terminal T_SOUR at the OSI model Level 2, insofar as this terminal must be able to dialogue at Level 2 with other gateways or routers of the network in order to transmit data packets to the outside, and then receive them from the outside, in which case it will be completely isolated from the network if this dialogue is interrupted.

Specifically, the invention uses, on the one hand, an authentication protocol entity (also called "module") PA1 and an application program APPLI1 implemented in the source terminal T_SOUR, and on the other, an authentication protocol entity (or "module") PA2 and a filtering FILT function (also called "module") implemented in the firewall PF, and lastly, an application program APPLI2 implemented in the captive portal PORT.

The authentication protocol entity PA1 implemented in the terminal T_SOUR must be able to interact (dialogue D2 in FIG. 2) with the application program APPLI1 that, in turn, distributes the secret information when the authentication of the terminal T_SOUR on the network (dialogue D1 in FIG. 2) is successful.

Figure 3:
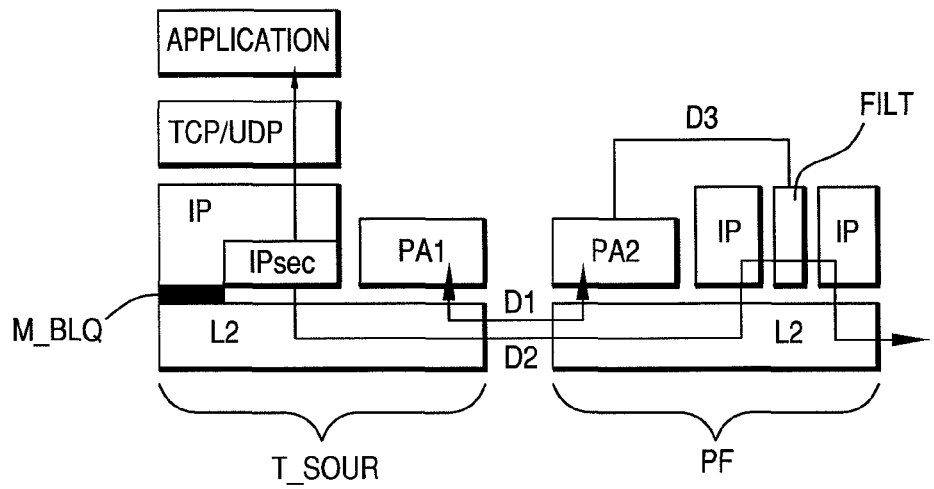
FIG. 3 represents the data streams implemented between the source terminal, the firewall, and the authentication portal when using the block mode tunnel.

The authentication protocol entity PA1 implemented in the terminal T_SOUR must also be in direct contact with the OSI model Layer 2 (L2), through which it communicates with the corresponding entity PA2 implemented in the firewall PF (dialogue D1 in FIG. 3.)

The authentication protocol entity PA2 implemented in the firewall PF must be able to interact (dialogue D3 in FIG. 2) with the application program APPLI2 that in turn distributes the secret information when the authentication of the terminal T_SOUR on the network is successful, and with the packet filtering FILT function (dialogue D3 in FIG. 3) to make it "pass" when the authentication checked by the PA1 and PA2 entities is successful and "block" when the authentication checked by the PA1 and PA2 entities is not successful.

The authentication protocol entity PA2 implemented in the firewall PF must also be in direct contact with the OSI model Layer 2, through which it communicates with the corresponding PA1 entity implemented in the source terminal T_SOUR (dialogue D1 in FIG. 3.)

Except in the case of a specific adaptation that will be discussed later, the terminal T_SOUR and the firewall PF must be in direct view on the OSI model Layer 2—that is, exempt of any intermediary router.

Chronologically, the procedure includes an initial phase for authenticating the terminal T_SOUR and a subsequent periodic phase for re-authenticating the PA1 and PA2 entities.

Figure 2:
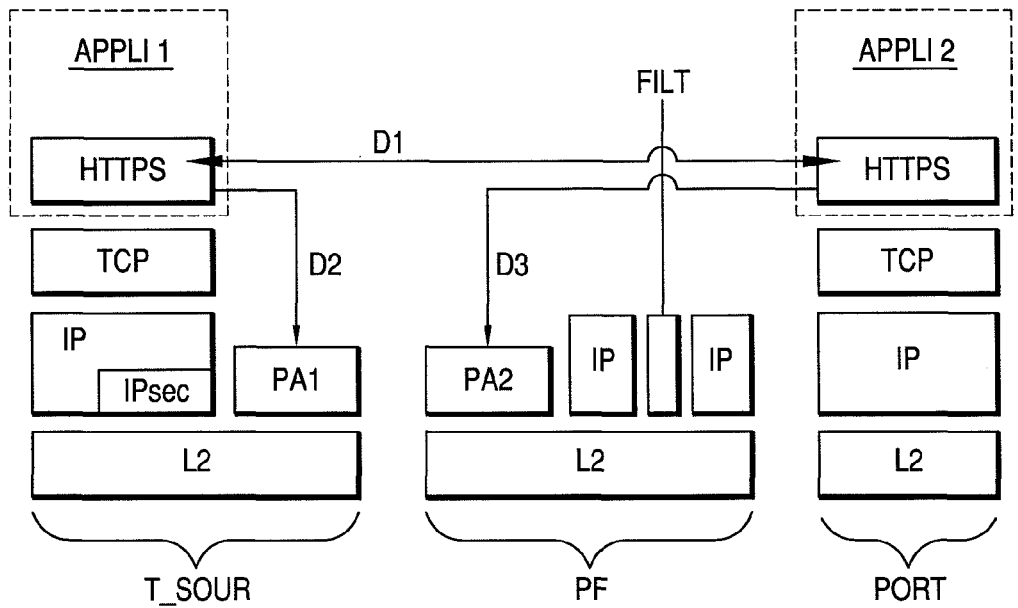
FIG. 2 represents the data streams implemented between the source terminal, the firewall, and the authentication portal, from the authentication procedure of the source terminal.

During the initial authentication phase, the source terminal T_SOUR, or its users, is authenticated by the captive portal PORT by exchanging data via the secured link represented by dialogue D1 in FIG. 2; this confidential link can be in the standard TLS/SSL format.

The secret information is obtained from this authentication, symmetrically on the source terminal T_SOUR and the captive portal PORT, using application programs APPLI1 and APPLI2, respectively, and then retransmitted by the latter to the corresponding authentication entities PA1 and PA2 (dialogues D2 and D3 in FIG. 2.)

Once the PA1 and PA2 entities have received the secret information that allows mutual recognition, they periodically implement the re-authentication protocol of the terminal T_SOUR by the firewall PF (dialogue D1 in FIG. 3.)

As long as this re-authentication is successful, the filtering module FILT of the firewall PF is told by the PA2 entity (dialogue D3 in FIG. 3) to remain in "pass" mode for the terminal T_SOUR data (dialogue D2 in FIG. 3;) this filtering module FILT is, otherwise, told to go into "block" mode.

Under these conditions, as long as the filtering FILT module remains in "pass" mode, the data stream in which the terminal T_SOUR is implicated can flow freely. If this terminal chooses to pass to "block" mode, for example, by invoking IPSec with specific types of software programs, then the re-authentication between the PA1 and PA2 entities can continue, and the access control at the firewall PF level thus remains valid.

Description of a Specific Embodiment of the Invention

This section presents a classical operating mode of a user connection to a network that supports "captive portal" technology. This technology is implemented in several commercial products, and is also available in an Open Source product called NoCatAuth (described, in particular, in the following site: http://nocat.net.)

This "captive portal" Open Source solution controls several Open Source filtering engines, such as "iptables," "packetfilter," or "IPFilter," respectively described in the following sites:

http://iptables.org,
http://www.benzedrine.cx/pf.html, and
http://www.ipfilter.org.

It allows controlling these filtering engines through a dialogue between the captive portal and an application controlling the filtering engine.

The stages of the standard connection procedure are the following:

1. The user connects to the network whose access control is performed by the captive portal.

2. The network allows recovering the standard connectivity data (IP address, DNS server addresses, default gateway addresses, etc.) This is normally performed using DHCP exchanges.

3. The user decides to authenticate in the network in order to have access of the services offered by the local site (normally the Internet.)

4. The user sends a request to the Internet that is intercepted by the filtering engine (default rules) and redirected to the "captive portal." The "captive portal" then presents the authentication banner to the user.

5. The user enters the authentication data (normally user name and password) that will be validated by the "captive portal."

6. The "captive portal" interacts with the filtering engine in order to modify the default filtering rules for this user. At this time, the user can then communicate with the outside (normally the Internet) according to the new filtering rules transmitted by the filtering engine.

7. The "captive portal" pushes a periodic authentication window to the user. This window allows maintaining the session between the user and the captive portal using the notion of authentication tokens, herein referred to as "session maintenance window."

In practice, the session maintenance window can be written in HTML code, which allows initiating a periodic connection to a correctly formatted URL (containing, specifically, the authentication token.)

Implementation of the Invention in the Context Described Above

The use of the session maintenance window, which is protected by SSL/TLS-based cryptographic mechanisms (https in FIG. 2,) allows obtaining secret information that is specific to the terminal T_SOUR and the captive portal PORT. The invention can therefore use these specific cryptographic mechanisms to ensure the confidentiality of the data transported on the new protocol specified at the OSI model Level 2, as well as the "anti-replay" function—that is, the function designed to block connection parasite attacks that consist in making it seem that a user is still active and in recovering the user's connection at a chosen time, for example, during a premature disconnection.

Given the multitude of possibilities offered by the tools known to those in the trade for ensuring cryptographic protection, the invention will be described below using a single specific non-limiting example.

The secret information, protected by SSL/TLS, is transmitted from the portal PORT to the terminal T_SOUR in the authentication window in response to a successful authentication of this terminal T_SOUR. In the authentication window, a counter, which is initialized both at the terminal T_SOUR end and the captive portal PORT end, is also transmitted. This secret information and this counter allow preventing identity spoofing attacks and replay attacks.

A keyed-hashing function type cryptographic algorithm (such as HMAC-MD5 or HMAC-SHA1) receives input data, such as the counter and the IP address of the terminal T_SOUR that is known by the captive portal, as well as the shared secret information (used as a key of the keyed-hashing function.) This results in a fixed length string that allows ensuring user authentication (owing to the shared secret information,) anti-replay (owing to the counter,) and machine authentication (owing to the IP address.)

The packet is sent from the PA1 entity of the terminal T_SOUR to the PA2 entity of the firewall PF using the Level 2 protocol employed by the invention. Then it is analysed by the captive portal PORT that checks the secret information and the counter.

If the check finalises successfully, then the counter is incremented.

Otherwise, the access control system of the portal PORT considers that there has been identity spoofing and chooses, depending on the security policy, the most appropriate decision for the situation, such as the decision that consists in terminating the connection by sending an instruction to the filtering FILT module or in ignoring the packet and continuing to wait for the reception of a valid packet (the connection is then terminated if no valid packet is received before the timeout corresponding to the validity duration of an authentication period.)

The invention is inserted at the level of the 7th stage of the standard connection process as indicated above. That is, at the stage in which the captive portal periodically pushes an authentication window to the user in order to maintain the session between this user and the captive portal through the use of an authentication token.

The invention sustains this session maintenance procedure but uses a different path for exchanging the authentication information between the user and the captive portal.

In practice, the session maintenance window includes an application software program PA1 that implements an authentication protocol associated to a program that displays a disconnection button that allows the user of the source terminal T_SOUR to disconnect by their own means.

This technique is based on the development in level 2 client-server mode.

Resorting to Java language for implementing the software program at the source terminal end is advantageous, although not mandatory.

The subsequent stages of the connection process according to the invention are the following.

8. The application software executed on the terminal T_SOUR periodically sends packets over the Ethernet segment to the firewall PF, thus indicating that this terminal is still active; if a hacker presents these invalid authentication tokens, these will be detected by the cryptographic procedures applied. The security strategy can easily be tailored to this type of event. It is therefore possible, for example, to disconnect the user and trigger an alarm to the captive portal administrators. It is also possible to ignore the spoofed token, continue to wait for a valid packet until the timeout of a default delay allocated to the connection, and trigger an alarm to the captive portal administrators.

9. An application software PA2 present on the firewall PF listens for data contained in the packets sent by the source terminal T_SOUR. The firewall can, using the data contained in the packets sent, determine that the user of the terminal T_SOUR is legitimate and that this terminal is still connected.

10. Two scenarios are possible that may cause the disconnection of the source terminal T_SOUR:

a. If the user suddenly disconnects from the network—that is, without using the disconnection button in the session maintenance window, the user closes the session maintenance window at the same time so that the application software PA1 will no longer be running. Consequently, the captive portal PORT will only continue to authorise the connection of the terminal T_SOUR during the pre-fixed residual session time. The access control system of the portal PORT will then consider that the user is no longer present on the network and no longer authorized to communicate via the firewall PF. The captive portal will therefore update the filtering rules of the firewall PF to prohibit connection of the terminal T_SOUR.

b. The user disconnects him/herself from the network, the access control system of the portal PORT will be informed that this user wishes to disconnect. To do so, the user will notify the access control system of the portal PORT that he/she wants to leave the network by using the disconnection button in the session maintenance window. The access control system of the portal PORT will therefore consider that the user is no longer present on the network and no longer authorized to communicate via the firewall PF. The captive portal will therefore update the filtering rules of the firewall PF to prohibit the connection of the terminal T_SOUR.

Insofar as the communication between the terminal T_SOUR and the captive portal PORT must be established using a Level 2 protocol, it is possible to use existing protocols such as ARP for encapsulating the payload in the specific areas of the protocol. The only requirement that must be satisfied is to arrange things so that the server can understand the specified protocol at the user end. Nevertheless, it is also possible to specify an Ethernet-based protocol. The important thing to remember is that a Level 2 protocol must be specified.

The protocol used by the session maintenance application software is located at Level 2 of the OSI layer, it does not cross Level 3 equipment—normally routers. It may therefore be necessary to also specify an encapsulation protocol and bi-directional frame Layer 2 transport protocol from the user and/or to the remote firewall.

This constraint is applicable within the framework of centralized architectures between several "hot spots" distributed in distinct geographical areas, which are all interconnected over a central site where the central captive portal will be located.

Nevertheless, another solution consists in deploying captive portals for each remote "hot spot" and in no longer performing access control on the central site.

Furthermore, insofar as the invention requires the presence of an application software (PA1, FIG. 2) running on the source terminal, it might be judicious to provide for the following:

that this software program be downloaded in a transparent manner from the captive portal following the successful authentication of the source terminal with this portal; this can be done using the session maintenance window that transports the authentication token in the current process.

that this software be executed locally on the source terminal in a manner that is transparent to the user.

that this software be deactivated at the end of the session when the session maintenance window is closed.

The invention offers the additional advantage of allowing the transmission of data other than authentication data. For example, it is possible to leverage the communication channel open in Layer 2, and which cannot be blocked, to pass billing data from the captive portal to the user (volume of data exchanged, time consumed, time remaining, etc.) This type of information can be displayed in the session maintenance window in the form of a control panel.

Figure 4A:
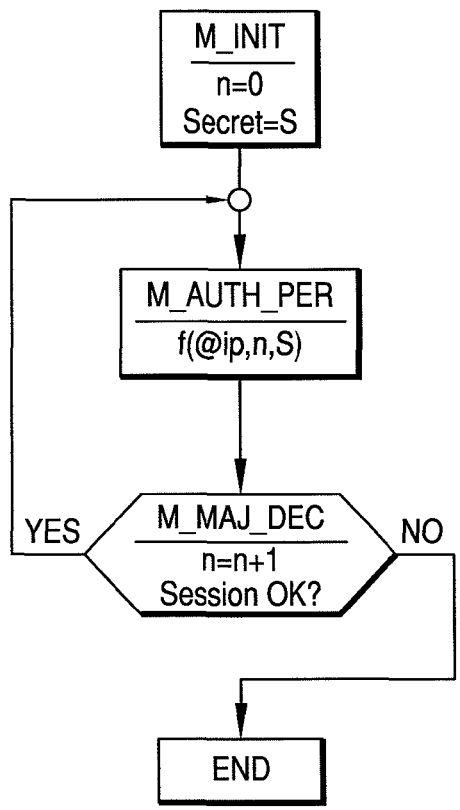
FIGS. 4A and 4B are flowcharts that respectively represent the computer program implemented on the source terminal, and the computer program implemented on the firewall.
Figure 4B:
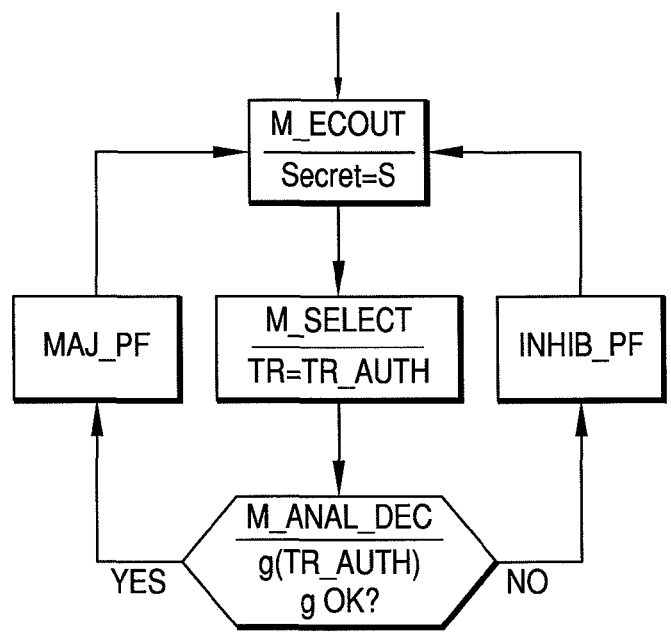

The computer programs implemented on the source terminal T_SOUR and on the firewall PF are illustrated, respectively and in a functional and schematic manner, in FIGS. 4A and 4B.

The program illustrated in FIG. 4A, which is implanted in the source terminal T_SOUR, is designed to conditionally authorise a connection from this source terminal in block tunnel mode with the destination terminal T_DEST of the network via the firewall PF.

This program is essentially composed of an initialization module M_INIT, a periodic authentication confirmation module M_AUTH_PER, and an update and decision module M_MAJ_DEC.

The function of the initialization module M_INIT is to initiate the authentication process.

To do so, this module M_INIT, which is activated after the initial authentication of the source terminal T_SOUR by the captive portal PORT, allows this source terminal to recover the shared secret information S communicated by the portal PORT and to initialise a counter n.

The periodic authentication confirmation module M_AUTH_PER, which is invoked by the initialization module M_INIT, is likely to create a unique authenticator and transmit this authenticator to the firewall PF over the OSI model Layer 2.

As is symbolically suggested in FIG. 4A, the authenticator transmitted is, for example, created as a function f of the IP address of the source terminal, of the counter n contents, and of the shared secret information S.

The update and decision module M_MAJ_DEC, which is invoked by the periodic authentication confirmation module M_AUTH_PER, essentially performs two functions.

Firstly, this module increments the counter n in view of the next authentication of the source terminal.

Secondly, the module M_MAJ_DEC monitors the communication with the firewall, in order to terminate the connection should an error arise, and notably, in the case of prolonged silence by the firewall.

In the absence of errors, the M_MAJ_DEC re-invokes the periodic authentication confirmation module M_AUTH_PER to allow the latter to proceed with a new authentication of the source T_SOUR in the firewall PF during the blocking tunnel mode connection.

The program illustrated in FIG. 4B, which is implanted on the firewall PF, is designed to conditionally authorise a block tunnel mode connection between the source terminal T_SOUR and the destination terminal T_DEST of the network via the firewall PF.

This second program essentially comprises a listener module M_ECOUT, a selection module M_SELECT, and an analysis and decision module M_ANAL_DEC.

The listener module M_ECOUT permanently listens to the network.

The selection module M_SELECT, which is invoked by the listener module M_ECOUT, is likely to locate, in the frame streams that flow over the OSI model Layer 2, the frames TR that constitute the authentication frames TR_AUTH of the source terminal T_SOUR, and to route these authentication frames TR_AUTH to the analysis and decision module M_ANAL_DEC.

The purpose of the analysis and decision module M_ANAL_DEC, in turn, is to check the contents of the authentication frames TR_AUTH received from the source terminal—that is, to generate a decision function g based on these frames TR_AUTH.

If the data contained in the TR_AUTH frames is not recognised as acceptable, the analysis and decision module M_ANAL_DEC triggers an operation INHIB_PF that corresponds to the destruction, on the firewall PF, of the access rules of the source terminal T_SOUR.

If, on the other hand, the data contained in the frames TR_AUTH are correct, the analysis and decision module M_ANAL_DEC triggers an operation MAJ_PF that corresponds to the creation or update, on the firewall, of the access rules of the source terminal T_SOUR.

The invention claimed is:

1. Access control procedure of a source terminal to a network comprising an access point for the source terminal, a firewall connected to the access point, and an authentication portal coupled to an authentication database, said authentication portal adapted to place the firewall in an access authorization status in response to an initial access request in a basic mode, the access request originating from the source terminal and including provision of valid authentication data to the portal or the firewall, in the absence of valid authentication data the firewall is placed in an access denial status, the firewall remaining in access authorization status in basic mode in response to the periodic supply, by the source terminal over a token exchange secure channel, of a valid authentication token, and the source terminal selectively communicating in tunnel mode with a destination terminal of the network using a block tunnel, characterized in that at least the periodic supply of the authentication token is performed by a transmission over an OSI Layer 2 level of the token exchange secure channel established between the source terminal and the firewall such that the periodic supply of the authentication token is maintained during a block tunnel mode communication.

2. Access control procedure according to claim 1, characterized in that it includes, after a successful initial authentication operation of the source terminal, at least one operation for creating secret information implemented on the source terminal and/or on the captive portal by at least one application program and a retransmission operation to communicate the secret information to the corresponding authentication entities of the source terminal and the firewall.

3. Access control procedure according to claim 2, characterized in that the secret information is transmitted in a secure manner from the captive portal to the source terminal in an authentication window.

4. Access control procedure according to claim 3, characterized in that the authentication window also ensures the transmission, from the captive portal to the source terminal, of a counter initialized both at the source terminal end and at the captive portal end.

5. Access control procedure according to claim 3, characterized in that the authentication window includes a disconnection button.

6. Access control procedure according to claim 3, characterized in that, after a successful initial authentication operation of the source terminal, the authentication token is periodically provided by an authentication entity of the source terminal to an authentication entity of the firewall which checks the token.

7. Access control procedure according to claim 4, characterized in that after a successful initial authentication operation of the source terminal, the counter is periodically provided by an authentication entity of the source terminal to an authentication entity of the firewall which checks the counter.

8. Access control procedure according to claim 6, characterized in that the authentication entity of the firewall, after checking the data provided by the authentication entity of the source terminal, places a filtering module of the firewall in an access authorization or denial status, depending on a result of the checking.

9. Access control procedure according to claim 3, characterized in that the authentication entity of the source terminal is created in Java language, downloaded during the initial authentication of this source terminal, and executed in the session maintenance window.

10. Access control procedure according to claim 3, characterized in that the OSI model Layer 2 level transmission established between the authentication entities of the source terminal and of the firewall are developed according to an extension of the ARP protocol.

11. A computer readable medium having stored thereon a source terminal program including software instructions that, when executed by a processor within a source terminal, cause the processor to perform operations comprising:
  conditionally authorizing a connection of the source terminal in block tunnel mode with a destination terminal of a network through a firewall controlled by a network captive portal, the source terminal program having:
    an initialization module for recovering shared secret information from the portal and initializing a counter,
    a periodic confirmation module invoked by the initialization module and adapted to create and transmit to the firewall, over an OSI model Layer 2 level, a unique authenticator that depends on at least the shared information and contents of the counter, and
    an update and decision module invoked by the periodic authentication confirmation module and adapted to increment the counter, to terminate the connection in the event of a communication error with the firewall, and to again invoke the periodic authentication confirmation module in the absence of a communication error with the firewall such that the source terminal continues to be authenticated by a firewall during the block tunnel mode connection.

12. A computer readable medium having stored thereon a firewall program including software instructions that, when executed by a processor disposed in a firewall installed on a network and controlled by a captive portal of the network, cause the processor to perform operations including:
  conditionally authorizing a block tunnel mode connection between a source terminal and a destination terminal of the network via the firewall, the firewall program characterized in that it includes a network listener module, a selection module, and an analysis and decision module, wherein the network listener module, in response to an authentication request received from the source terminal, attempts to recover shared secret information originating from the source terminal, and wherein the selection module is invoked by the listener module and is adapted to obtain, from the frame stream that flows over an OSI model Layer 2 level, the authentication frames from the source terminal, and to route the authentication frames to the analysis and decision module, which checks the content of the authentication frames, terminates the connection of the source terminal in the case of an error, and updates the connection authorization rules used by the firewall in the absence of an error.

13. System for controlling the access by a source terminal to a computer network and that includes a firewall disposed along a communication path between said computer network and the access point for said source terminal, and an authentication portal that controls the status of said firewall, in which the firewall can maintain a secure communication channel open for the source terminal as long as the source terminal sends, periodically or on an event triggered basis, an authentication token, characterized in that:
  the firewall includes an authentication protocol module and a filtering module; said authentication protocol module provides said filtering module with a status indicating "pass" or "block" for the communication between the source terminal and the computer network, depending on whether the source terminal is authenticated or not,
  the authentication portal includes an application program that can distribute secret information to the authentication protocol module when an initial authentication of the source terminal over the computer network is successful,
  the source terminal includes an authentication protocol module and an application program adapted to distribute the secret information of said authentication protocol module when the initial authentication of the source terminal over the computer network is successful,
  the authentication protocol module being adapted to send authentication tokens to the authentication protocol module using an OSI model Layer 2 level.

* * * * *